United States Patent [19]

Wieland

[11] Patent Number: 4,893,958
[45] Date of Patent: Jan. 16, 1990

[54] JOINT FOR DEMOUNTABLE FURNITURE

[75] Inventor: Roy M. Wieland, Fort Wayne, Ind.

[73] Assignee: R. M. Wieland Company, Grabill, Ind.

[21] Appl. No.: 253,665

[22] Filed: Oct. 5, 1988

Related U.S. Application Data

[63] Continuation-in-part of Ser. No. 95,767, Sep. 11, 1987, which is a continuation-in-part of Ser. No. 499,812, Jun. 1, 1983, abandoned.

[51] Int. Cl.$^4$ .............................................. B25G 3/00
[52] U.S. Cl. ...................................... 403/7; 403/362; 403/297
[58] Field of Search ...................... 403/7, 8, 362, 297, 403/295; 292/350

[56] References Cited

U.S. PATENT DOCUMENTS

| | | |
|---|---|---|
| 838,944 | 12/1906 | Bohy . |
| 2,053,382 | 9/1936 | Stickley . |
| 2,463,796 | 3/1949 | O'Rourke . |
| 2,605,820 | 8/1952 | Powellek . |
| 2,746,769 | 5/1956 | Hoogendoorn . |
| 2,868,604 | 1/1959 | Gibson et al. . |
| 3,484,830 | 12/1969 | Wagner et al. . |
| 3,545,625 | 12/1970 | MacMillian . |
| 3,620,558 | 11/1971 | MacMillan ...................... 403/362 X |
| 3,977,800 | 8/1976 | Cassel . |
| 4,116,573 | 9/1978 | Fuch . |
| 4,291,999 | 9/1981 | Vandelanoite . |
| 4,411,312 | 10/1983 | English . |

FOREIGN PATENT DOCUMENTS

| | | |
|---|---|---|
| 2156497 | 11/1971 | Fed. Rep. of Germany . |
| 2436904 | 5/1980 | France . |

Primary Examiner—Andrew V. Kundrat
Attorney, Agent, or Firm—Jeffers, Hoffman & Niewyk

[57] ABSTRACT

A joint for a knock-down furniture assembly including a rod which has a slip fitting engagement with a bushing. The rod is affixed to one component of the furniture and the bushing to another component. In one embodiment, the rod has a head which fits within a hole in a first wood component and is captured by means of cured epoxy resin introduced into the hole or on an immediate adjacent portion of the rod shank. Set screws are threaded into tapped holes in the side wall of the bushing and are accessible through aligned holes in the second wood component for actuation by polygonally shaped wrench engaging similarly shaped sockets in the ends of the set screws for tightening against the inserted rod shank thereby to lock the two components in assembly and for loosening to unlock them. In another embodiment, the rod is an octagonal rod which slip fits into a square tube. The octagonal rod includes a transverse threaded bore into which a set screw is inserted. The tube includes an access opening for the set screw. The set screw forces two sides of the octagonal rod against two sides of the square tube for perfect alignment of the sides of the rod and tube.

9 Claims, 4 Drawing Sheets

JOINT FOR DEMOUNTABLE FURNITURE

BACKGROUND AND SUMMARY OF THE INVENTION

This application is a continuation-in-part of my United States patent application entitled KNOCK-DOWN FURNITURE ASSEMBLY, filed Sept. 11, 1987 as Ser. No. 095,767, which is a continuation-in-part of my United States application entitled KNOCK-DOWN FURNITURE ASSEMBLY, filed June 1, 1983 as Ser. No. 499,812, now abandoned.

This invention relates generally to furniture and is particularly concerned with a new and improved assembly for furniture which permits furniture components to be readily disassembled and reassembled.

Upholstered furniture is preferred for many uses, but experience shows that upholstered furniture becomes soiled and worn during use and over time presents a less than new appearance. In order to restore upholstered furniture to a fresh condition, the upholstery should be periodically cleaned. If it is extremely soiled or damaged re-upholstering or replacement may be called for. Unfortunately, cleaning of soiled upholstery and repair of damaged upholstery are often made difficult because of the construction of the furniture itself. Most upholstery is not removable for cleaning, replacement, or repair, and therefore soiled and damaged conditions are often tolerated due to that inconvenience. Soiled and damaged furniture is also sometimes tolerated where cleaning, repair, or replacement cannot be afforded or is not economically justified.

In order to prolong the useful life of an article of furniture while maintaining a fresh looking appearance, it is possible to provide a furniture construction in which the upholstery is readily removable so that it can either be cleaned and/or repaired and then reinstalled, or else be replaced by new upholstery.

Applicant has developed articles of furniture which can be kept fresh looking for an extended period of time because of the conveniently removable nature of its upholstery. Yet these articles of furniture are sturdy, rugged, and are not readily susceptible to unauthorized tampering, even though they permit convenient removal and reinstallation of upholstery.

One of the problems associated with providing removable and reinstallable upholstery is that the furniture itself often must be disassembled. Knock-down articles of furniture are of course well known. Many of the knock-down systems, however, are unsatisfactory for any of a number of different reasons. For example, the joints may be too difficult to disassemble and reassemble, or they may not be sturdy enough for long term usage or to withstand repeated disassembly and reassembly. Also, known joints used in knock-down systems cannot adjust for varying cushion foam and fabric thicknesses. Other problems are that the joints may be too readily disassembled, may too easily become loose, or may present an invitation to unauthorized disassembly and subsequent theft.

The present invention is directed to a new and improved knock-down furniture assembly relating in particular to a joint for joining separable components of a piece of furniture. The invention overcomes the foregoing disadvantages in that it comprises a joint which, although substantially concealed from view to discourage unauthorized tampering, is yet surprisingly readily operable by authorized individuals to permit convenient disassembly and reassembly. Moreover, the construction of the joint is such that the assembled components can remain sturdily joined over a course of use even though being disassembled and reassembled a number of times. A still further attribute of the invention is that it comprises relatively few and uncomplicated component parts and is therefore of economical construction.

The invention allows the furniture to be disassembled and reassembled for maintenance, yet is strong and secure. Fabric covers can be removed for cleaning and/or repair and reinstallation, or alternatively replacement, even by untrained maintenance personnel. Fastening is strong, stronger than glued and dowelled joints, screwed joints, corner-blocks, or other knock-down fasteners, such as post-and-slot knock-down clips. The invention can be made highly tamper-resistant since fasteners are hidden from sight, or recessed within wood, and subsequently covered, by other parts of the furniture (seat and back cushions, front rails, etc.) It is esthetically pleasing in that no fasteners are exposed to view.

In the disclosed preferred embodiment contained in the present patent application, the article of furniture is a chair in which the sides are removable from the seat and back, joints embodying principles of the invention being provided between the sides and the seat and back. Each joint comprises axially mutually slip fitting elements, one of which is affixed to a seat and back section and the other of which is affixed to a side section. The slip fit direction is in the same direction as the sections separate.

The element of each joint which is affixed to the seat and back section comprises a tubular bushing. The bushing fits within a bore in a part of the framework of the seat and back section. Each bushing is provided with a pair of threaded holes in its sidewall which are spaced axially apart. These threaded holes align with corresponding holes provided in the framework member within which the bushing is disposed. Set screws are threadedly engaged with the threaded holes, and are accessible for operation via the aligned holes in the framework member.

The remainder of each joint comprises a rod which is affixed to the framework of the corresponding side section. Each rod comprises a shank which has a slip fit engagement with the corresponding tubular bushing, and it also has a head which fits into a hole in the framework of the corresponding side section. Each rod is secured in place by a cured epoxy resin which fills the corresponding hole to capture the head within the hole.

In the assembled chair, the rods on each side section slip fit via their shanks into corresponding bushings in the seat and back section. The extent to which the rods penetrate the bushing is affected by the thickness of the fabric and foam of the cushion, it being anticipated that the density of the foam might vary over time, thereby requiring different degrees of penetration. The set screws are operated by suitable tools to bear against the sides of the slip fitted shanks thereby locking the two sections together. The set screws are recessed within their access holes and therefore are not exposed to view. The joints are also disposed in location which are hidden from view so as not to be apparent to an observer. They are however readily accessible to an authorized individual knowledgeable in the construction of the chair.

The sections are separated by unthreading the set screws to release them from their forceful abutment with the shanks of the rods. When all set screws have been released, the side sections can be separated with the rods slipping out of the bushings. This allows the chair to be disassembled for transport, storage, and/or maintenance purposes and also provides access to removable upholstery on the respective sections so that the upholstery can be removed for cleaning, repair, and/or replacement. Subsequently, upholstery is reinstalled, and the sections can be reassembled in the reverse manner from their disassembly.

The invention, in accordance with another embodiment thereof, provides a joint for attaching a first component of an article of furniture to a second component thereof. The joint comprises an elongated tubular member having an end opening and a sidewall and being mounted at one end to the first component. The joint further comprises an elongated bar member, mounted at one end to the second component, being adapted to axially slip fit into the tubular member through the end opening. Means are provided for locking the bar member within the tubular member when the bar member and the tubular member are operatively assembled. The locking means comprises a set screw threadedly engaged with a transverse threaded bore in the bar member, and an access opening in the sidewall in the tubular member. The access opening is located to align with the threaded bore and provide access to the set screw when the bar member is slip fit into the tubular member. The set screw is selectively operable to bear against the sidewall of the tubular member.

In another embodiment of the invention, the tubular member is square and the bar member is square. The bar member is dimensioned to be small enough to slide easily into the tubular member. In still another embodiment of the invention, the tubular member is square whereas the bar member is octagonal. By means of this arrangement, the bar member will always seat properly in the tubular member and thereby provide a joint which is extremely sturdy and not subject to working loose.

A further aspect of the present invention is the provision of means for attaching a cushion of an article of furniture to a frame member thereof. Typically, furniture cushions are either independent of the article of furniture they accompany, or they are integrally secured thereto. A problem arises in either case in that the cushions may become lost, stolen, or otherwise separated from the article of furniture, or they are so permanently a part of the furniture that cleaning, reupholstering, replacement, and removal is very difficult, if not impossible. It is desired to provide a means for attaching cushions to furniture frame members whereby the cushion is positively attached to the furniture so as to provide easy access therearound for cleaning, yet is easily detached for replacement or repair. Accordingly, the present invention, in one aspect thereof, provides means for easy attachment of a cushion to the frame of an article of furniture, wherein cooperatively fitting members are located on each of the cushion and the furniture frame.

More specifically, a cushion assembly comprising a foam body member having an upholstered cover is provided with an elongated tubular member attached thereto. One end of the elongated tubular member having anchoring means is disposed within a slit in the foam body and is positively retained therein as the slit is bonded closed. The end of the tubular member extending from the cushion assembly includes an open end and a sidewall having an access opening therethrough. An elongated bar member is mounted at one of its ends to a frame member of the article of furniture. The elongated bar member is adapted to axially slip fit into the open end of the tubular member and is retained therein by locking means associated with the elongated bar member. The locking means comprises a set screw threadedly engaged with a transverse threaded bore in the bar member. When the cushion assembly is operatively attached to the furniture frame member, the access opening in the tubular member is aligned with the threaded bore in the bar member to provide access to the set screw. The set screw is selectively operable to bear against the sidewall of the tubular member to attach the cushion assembly to the furniture frame member.

There are several advantages to the aspect of the present invention whereby a cushion assembly is attached to a frame member of an article of furniture. The cushion assembly will not become lost, stolen, or otherwise separated from the article of furniture. Also, by the method of attachment claimed and described herein, the cushion assembly may be manipulated about the point of attachment to provide access therearound for cleaning and the like. Furthermore, a cushion having attachment means according to the present invention may be easily removed for cleaning, repair, or replacement. In the case of replacement, individual components of the cushion assembly may be more easily replaced.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
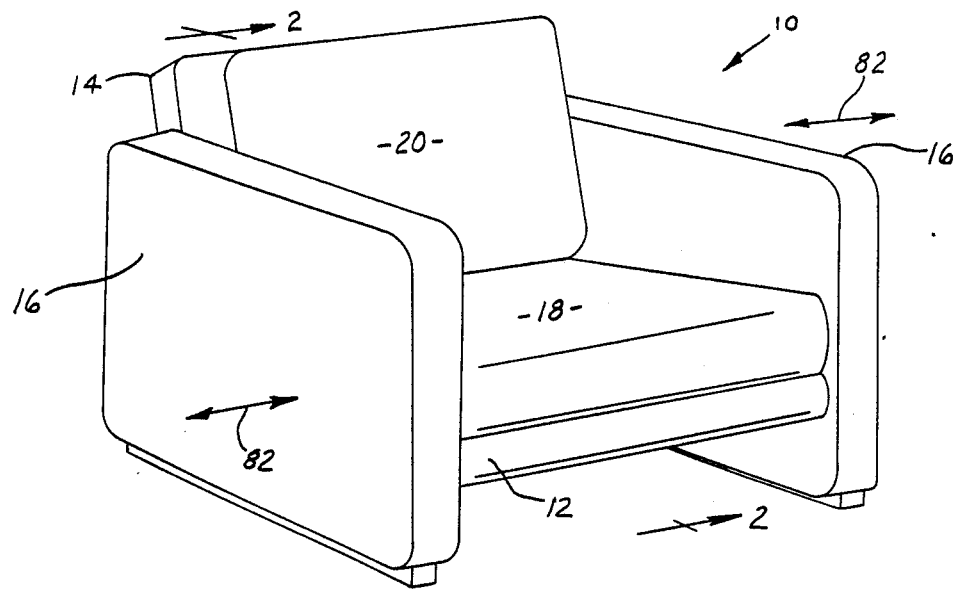
FIG. 1 is a perspective view of an article of furniture embodying principles of the invention, the preferred disclosed embodiment of a chair.

FIG. 1 illustrates an upholstered chair 10 embodying principles of the present invention. The chair comprises a seat 12, a back 14, and two sides 16. Cushions 18 and 20 are disposed on the seat and back respectively. The particular construction of chair 10 comprises the two sides 16 being separably joined with the seat and back.

Figure 2:
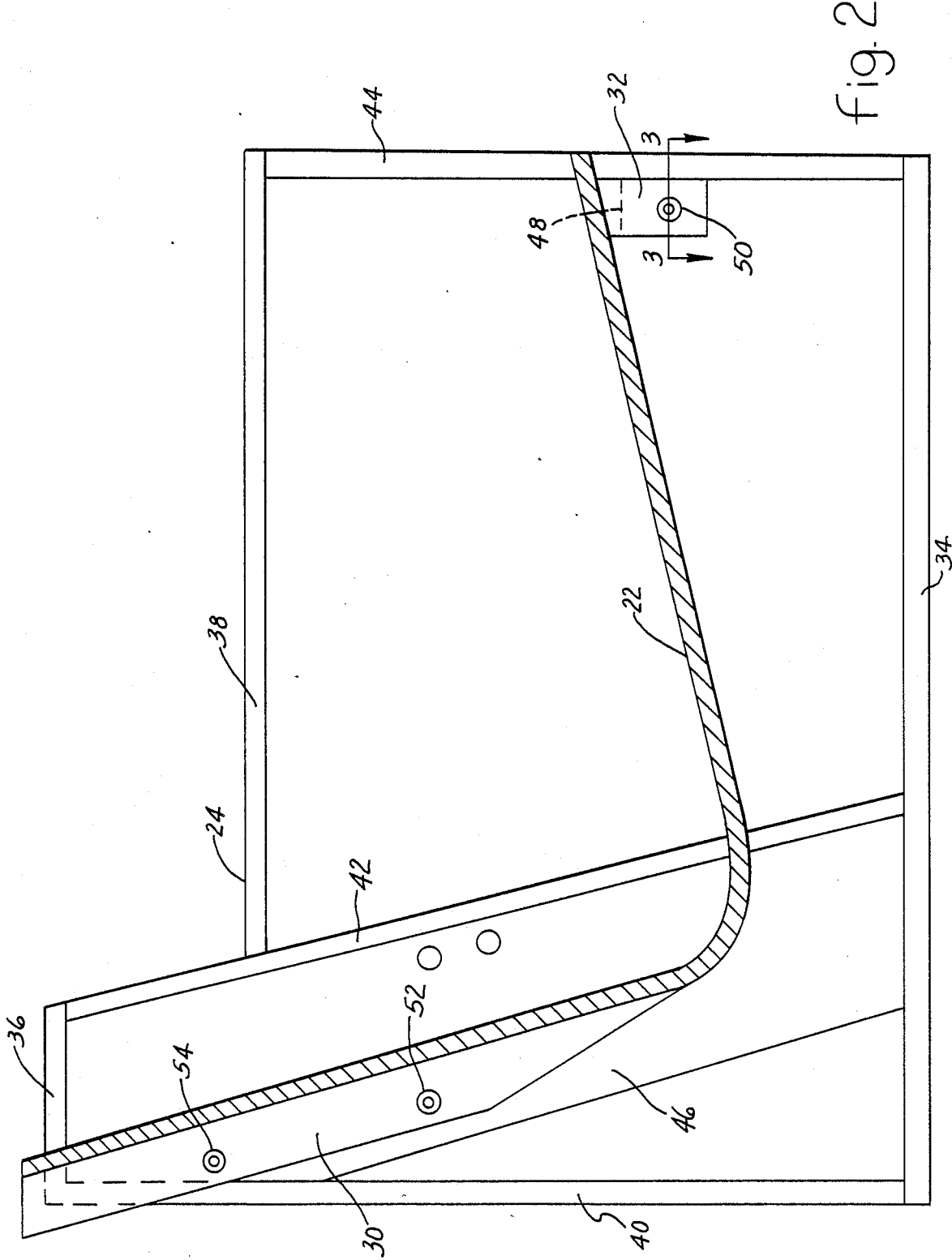
FIG. 2 is a central vertical cross sectional view looking laterally and taken substantially in the direction of arrows 2—2 in FIG. 1 on an enlarged scale but with portions removed.

FIG. 2 illustrates certain details of the internal framework construction which provides this capability. The framework is shown to comprise a contoured seat and back section 22 and a side section 24, the side section 24 which appears in FIG. 2 being the left hand side for an occupant of the chair. The right hand side section is symmetrically opposite to the left hand one. Affixed to the contoured seat and back piece along each lateral side of the back are mounting boards 30. Also affixed to the contoured seat and back section 22 along lateral sides adjacent the forward edge of the seat are mounting blocks 32 which mount to the underside of the seat.

Each side section is constructed of six members 34, 36, 38, 40, 42, and 44 suitably joined. A brace board 46 is also affixed to the side section to laterally confront mounting board 30. A front mounting block 48 is affixed to member 44 to laterally confront mounting block 32 of the seat and back section. These sections are typically constructed of wood or other suitable material.

Three joints are provided via which each side section 24 separably joins with the corresponding side of the seat and back section 22. In FIG. 2 the three joints by which the left hand side section joins with the seat and back section are identified by the reference numerals 50, 52, and 54. As can be seen, the joint 50 is provided at the front mounting blocks 32 and 48 while the remaining two joints are provided at mounting board 30 and brace board 46.

Figure 3:
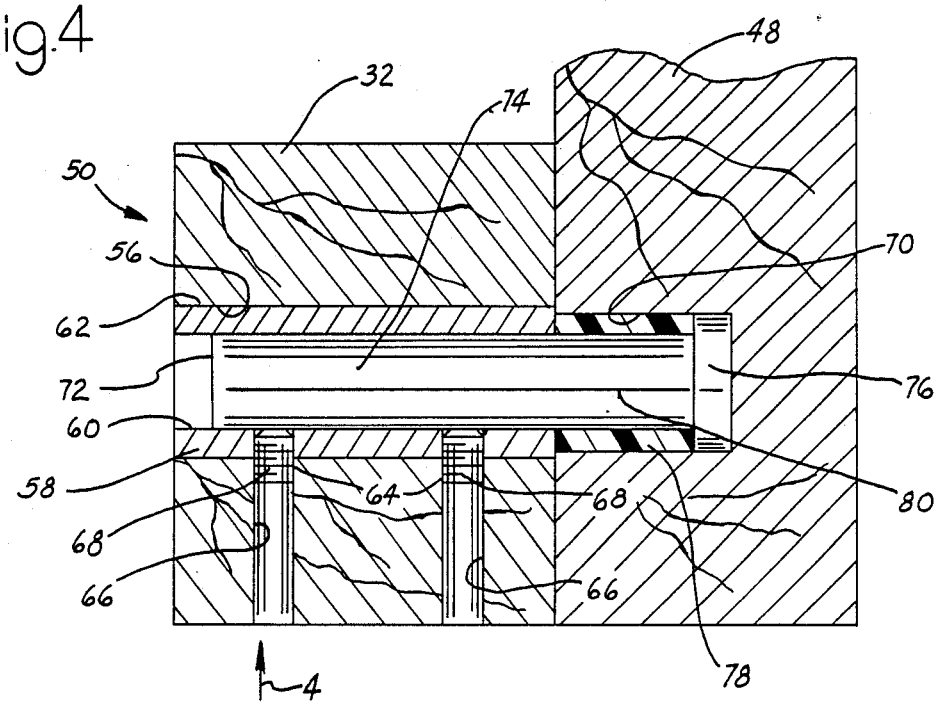
FIG. 3 is a vertical cross sectional view taken substantially in the direction of arrows 3—3 in FIG. 2 and enlarged.

FIG. 3 illustrates details of joint 50, and the construction of the other joints is similar. Joint 50 is provided in part by a laterally extending circular hole, or bore, 56 which extends completely through mounting block 32. A metal bushing 58 is disposed within hole 56 and is affixed to the mounting block by any suitable means. The length of the bushing is preferably such that its axial ends are flush with the opposite lateral faces of block 32. The bushing is of a circular shape having a circular inside diameter (I.D.) 60 and a circular outside diameter (O.D.) 62. A suitable I.D. is one half inch.

The bushing is further provided with a pair of threaded holes 64 through its sidewall. The axis of each hole is on a radial to the axis of the bushing, and the two threaded holes are axially spaced apart and in circumferential alignment about the axis of the bushing.

Block 32 is provided with a pair of holes 66 which respectively align with threaded holes 64 so as to form continuations of the threaded holes. Holes 66 extend from the lower exterior face of mounting block 32 to intercept hole 56. Threaded fasteners in the form of set screws 68 are disposed each within a corresponding one of the threaded holes 64 and the corresponding aligned continuation hole 66. The set screws are threadedly engaged with holes 64.

The remainder of the joint is provided in part by a hole 70 in the laterally inwardly facing surface of mounting block 48 coaxial with hole 56 in the confronting mounting block 32. A metal rod 72 is securely affixed to mounting block 48. Rod 72 comprises a circular cylindrical shank 74 and a circular cylindrical head 76. The diameter of head 76 allows it to fit closely within hole 70, and the axial dimension of head 76 is made less than the length of hole 70 so as to permit an immediately adjacent portion of the shank to be disposed within hole 70. In the illustrated construction, head 76 is fully disposed within the hole so that the end of the head abuts the bottom of the hole. This leaves a residual annular volume surrounding the immediately adjacent portion of shank 74 within hole 70 to receive a filler 78 for securing the rod on mounting block 48. The preferred material for this filler is an epoxy resin which is applied to fill this annular volume after the rod has been fully inserted into the hole and which is thereafter allowed to cure. The cured epoxy resin forms a bond between the mounting block and rod. It serves to securely retain the head of the rod in place while still allowing the two mounting blocks 32, 48 to be brought into confronting abutment with each other in the assembled piece of furniture.

The joint thus comprises a longitudinal axis 80 which is coaxial with rod 72 and bushing 58. This axis 80 extends laterally of the chair so as to align with the direction of the arrows 82 via which the sides 16 of the chair 10 are assembled to and disassembled from the seat and back section 22.

Figure 4:
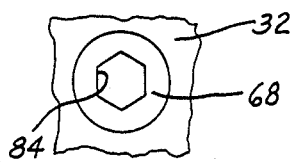
FIG. 4 is a view looking in the direction of arrow 4 in FIG. 3 and enlarged.

The I.D. 60 of bushing 58 and the O.D. of shank 74 of rod 72 are such that they provide a close fitting axial slip fit. With both set screws 68 of joint 50 positioned such that they are clear of the I.D. 60, joint 50 does not prevent the side from being displaced axially toward and away from the seat and back. With side 16 disposed against the seat and back section to abut blocks 32 and 48, as illustrated in FIG. 3, set screws 68 can be rotated to advance them in the radially inward direction relative to axis 80. The tips of the set screws 68 forcefully abut the side of shank 74 and may be tightened to exert a locking force between the rod 72 and bushing 58 which prevents the rod 72 from being slipped out of the bushing. It will be observed in FIG. 4 that the set screws 68 are provided with polygonally shaped sockets 84 in their radially outer ends. The sockets are intended to be actuated by a tool (not shown) of similar non-circular cross section. For example, the illustrated construction is a hexagonal socket suitable for use by a similarly sized hexagonal wrench. The wrench is inserted via the open end of each bore 66 to engage with the socket of the corresponding set screw 68. The untightening of the set screws 68 is effective to disengage them from their forceful engagement with the rod 72, once again allowing the rod 72 to slip out of the bushing 58. For removing a side 16, the set screws 68 of all joints along that side are loosened allowing the side 16 to be removed. The set screws 68 are loosened just enough so that they remain threaded with holes 64. The side 16 is reassembled in the opposite manner.

The unfastening procedure may be used whenever the need arises to remove a side or sides 16 from the seat and back 22. This is important in that it allows the upholstery to be removed for cleaning and/or replacing, and yet the joint construction remains sturdy and secure even though repeated disassembly and reassembly may take place over the lifetime of the furniture. Similarly, the furniture can be disassembled for transport or storage purposes if desired.

A further advantage of the invention is that it is substantially tamper resistant. The joints themselves are generally concealed within the assembled article of furniture. If one were to attempt to locate disassembly points, all one would see would be the openings of the holes 66. Because the set screws are relatively small in length in comparison to the length of the holes 66, the set screws 68 are located deep within the holes 66 and are only apparent, if at all, upon a very detailed investigation. Even then it will be difficult to determine the exact nature of what is contained within the bores 66 due to their small diameters. This coupled with the fact that a tool such as a polygonally shaped wrench is required, will discourage unauthorized tampering. However, a person having knowledge of the construction will be readily able to disassemble and reassemble a piece of furniture.

The application of the invention to the illustrated chair is advantageous in that the sides may be constructed in the manner illustrated. In other words, because the bushings and set screws are on the seat and back section, no access is needed through the side sections to lock and unlock the joints.

The superior attributes resulting from the invention enable the offering of extended warranty periods for manufactured furniture embodying the invention. In addition to its sturdiness, the joint is vibration and humidity resistant. It is not plagued by swelling or shrinking which is characteristic of many other types of furniture joints. Although shown with a chair, in this application, the invention may be used in other furniture pieces where joining of wood pieces is required.

Figure 5:
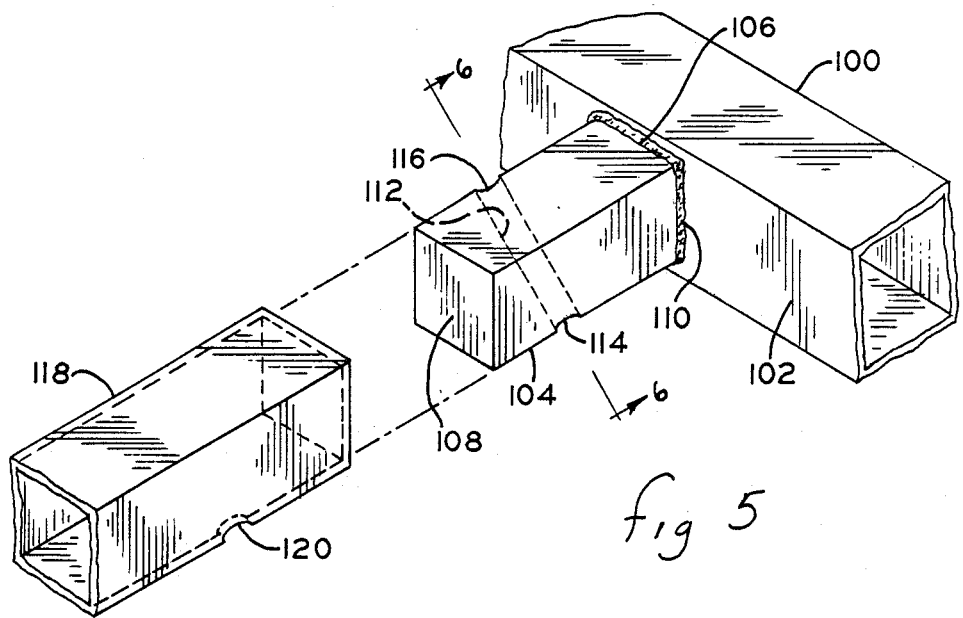
FIG. 5 is a fragmentary exploded perspective view of a furniture joint according to an alternative embodiment of the present invention.
Figure 6:
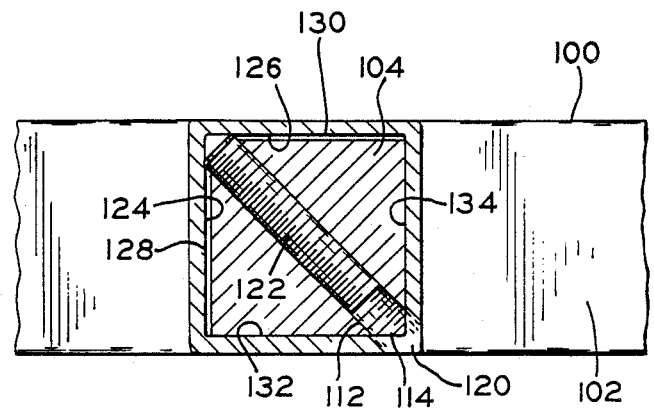
FIG. 6 is an enlarged fragmentary sectional view of the furniture joint of FIG. 5 taken along the line 6—6 in FIG. 5 and viewed in the direction of the arrows.

Referring now to FIGS. 5 and 6, there is shown an alternative embodiment of a joint for attaching components of an article of furniture according to the present invention. FIG. 5 illustrates a joint for an article of furniture having a frame member, such as square tubing 100. Square tubing 100 has a mounting side 102 to which an elongated tubular member, such as square bar 104, is mounted perpendicularly to the plane of mounting side 102. Square bar 104 includes a mounting end 106 and a protruding end 108. Mounting end 106 is attached to mounting side 102 of tubing 100 by a weld 110, or by some other suitable method of attachment. It is also contemplated that the frame member to which square bar 104 is attached may be of wood, and that square bar 104 would be epoxied thereto.

A threaded hole 112, having a head opening 114 and a bottom opening 116, extends through bar 104 transversely to the longitudinal axis thereof. In the embodiment illustrated in FIG. 5, threaded hole 112 extends diagonally through square bar 104 between axially extending edges thereof.

Protruding end 108 of square bar 104 is adapted for insertion into an elongated tubular member, such as square tube 118. Square tube 118 may be mounted to a component of an article of furniture or may itself comprise a component such as a tubular frame member. Square tube 118 and square bar 104 are adapted to axially slip fit together as shown in FIG. 5. When square tube 118 is axially slip fit over square bar 104 in its operative position, an access opening 120 in square tube 118 aligns with head opening 114 of threaded hole 112. Access opening 120 may be axially extended to allow access to head opening 114 over a small range of axial positions of square tube 118 and square bar 104 relative to one another.

FIG. 6 illustrates square bar 104 and square tube 118 in slip fit arrangement with one another, and, more particularly illustrates locking means for locking square bar 104 within square tube 118. Specifically, a set screw 122 is threadedly engaged in threaded hole 112 and is selectively operable by insertion of a tool through access opening 120 and head opening 114 to be adjusted to bear against a first pair of adjacent sides 124 and 126 of square tube 118. As illustrated in FIG. 6, when set screw 122 is adjusted to bear against sides 124 and 126 of tube 118, respective spaces 128 and 130 are created between square bar 104 and square tube 118. At the same time, square bar 104 is caused to bear against a second pair of adjacent sides 132 and 134 of square tube 118. In this way, relative axial and rotational movement between square bar 104 and square tube 118 is prevented. Use of square tubing and bar components is preferred due to the relatively high resistance of this type of joint to rotational forces. However, round tubing and bar components may also be used to practice the invention, as desired.

Figure 7:
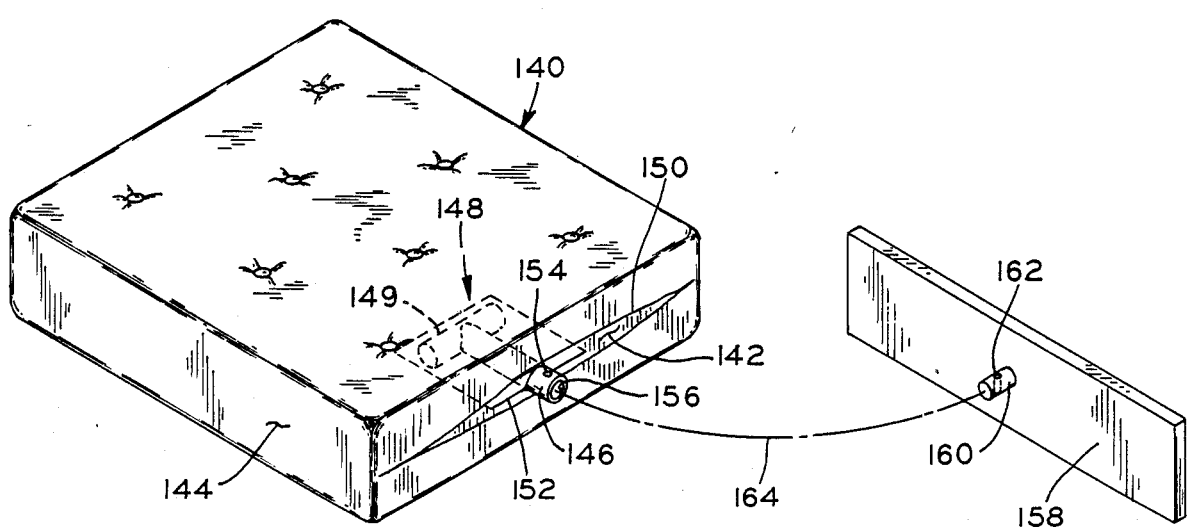
FIG. 7 is an exploded perspective view of an apparatus for removeably mounting a cushion member to a frame member of an article of furniture, according to an alternative embodiment of the present invention.

Referring now to FIG. 7, for yet a further embodiment of the present invention, there is shown a cushion assembly 140 comprising a foam body 142 and an upholstery covering 144. A bushing 146 is mounted to cushion assembly 140 in a manner such that a portion of bushing 146 is disposed within foam body 142. At the end of bushing 146 disposed within foam body 142, there is included anchoring means 148, such as an elongated crossbar member 149 welded to the end of bushing 146.

Bushing 146 and crossbar 149 are inserted within foam body 142 by providing an opening 150 in upholstery covering 144. Opening 150 provides access to foam body 142, in which a slit 152 is made that extends into the interior of foam body 142. Once bushing 146 is inserted therein, slit 152 is closed and bonded to retain bushing 146, having anchoring means 148, within foam body 142. Slit 152 may be bonded shut with glue or any other suitable bonding material for use with the foam material comprising foam body 142.

Analogous to the joint structure described in conjunction with FIGS. 5 and 6, bushing 146 includes an access opening 154 and an inside wall surface 156. Consequently, cushion assembly 140 is adapted to be attached to a frame member 158 of an article of furniture. Frame member 158 includes an elongated bar member such as solid rod 160, attached thereto by a suitable means disclosed herein for either a wooden of metal frame member 158. Solid rod 160 includes a threaded hole 162 extending transversely to the longitudinal axis of solid rod 160. As indicated by line 164, cushion assembly 140 is assembled to frame member 158 and may be secured thereto by locking means consisting of a set screw in threaded hole 162 accessible through access opening 154 and adjustable to bear against inside wall surface 156. It is appreciated that when cushion assembly 140 is attached to frame member 158 by the illustrated joint structure at one location, the remainder of cushion assembly 140 may be manipulated, such as by lifting, in order to clean beneath the cushion, gain access therebeneath, etc.

While a single method of retaining bushing 146 within foam body 142 has been disclosed, it is understood that alternative methods exist. For example, bushing 146 may be epoxy set into a block that is attached to the bottom of a plywood substrate within foam body 142. Alternatively, bushing 146 may be bolted to a piece of hardwood that is embedded and glued within foam body 142. Still further, bushing 146 may be mounted to the frame member 158 and rod 160 may be mounted to the cushion assembly 140.

Figure 8:
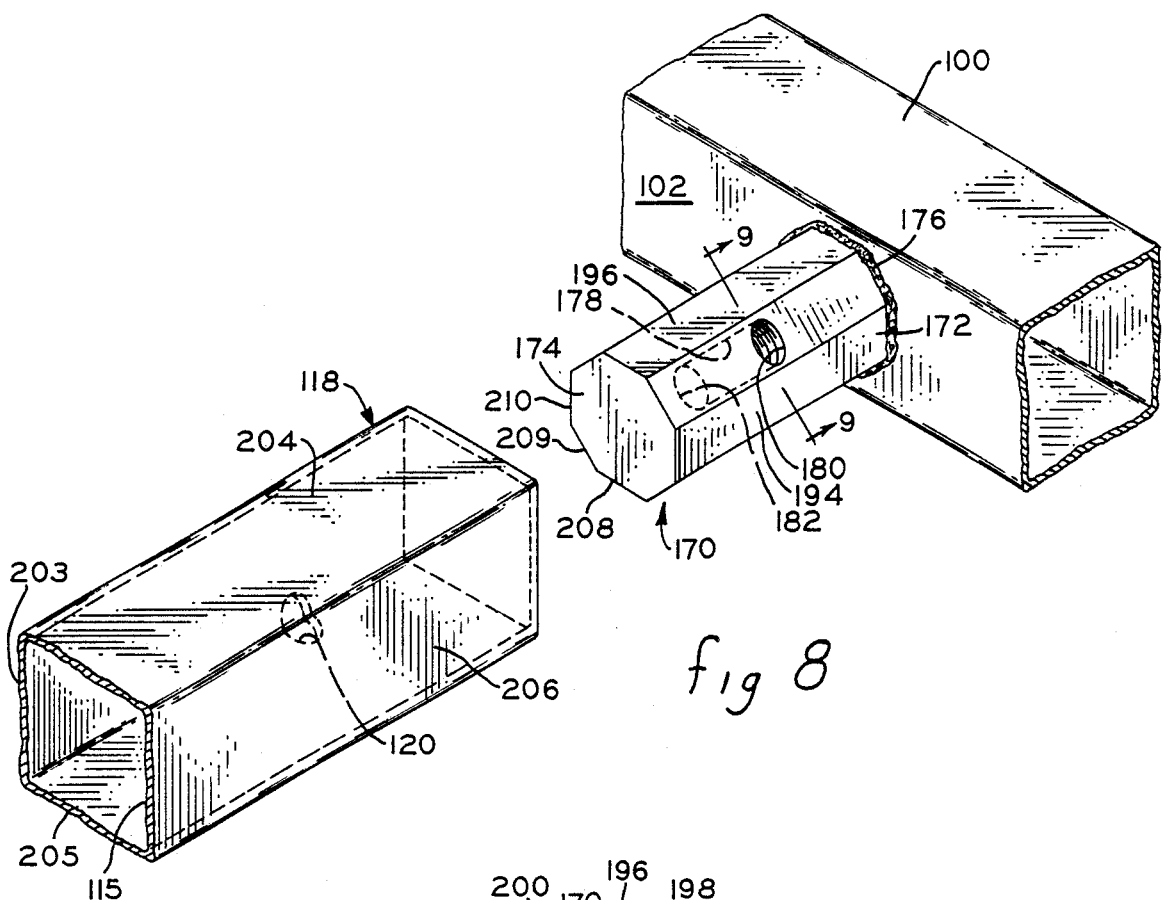
FIG. 8 is an enlarged fragmentary exploded perspective view of a furniture joint according to a further alternative embodiment the present invention.
Figure 9:
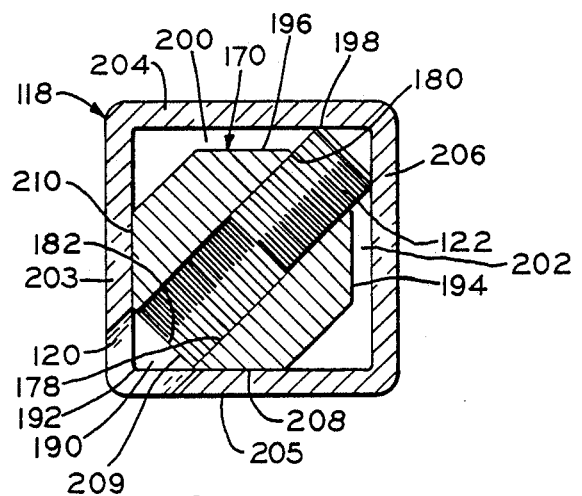
FIG. 9 is an enlarged fragmentary sectional view of the furniture joint of FIG. 8 taken along line 9—9 thereof and viewed in the direction of the arrows.

Referring now to FIGS. 8 and 9, there is shown a further alternative embodiment of a joint for connecting components to an article of furniture according to the present invention. FIG. 8 illustrates a joint for an article of furniture having a frame member, such as square tubing 100, similar to that disclosed in FIG. 5. Instead of the square bar 104 used in the embodiment of FIG. 5, a polygonal bar 170, in the illustrated embodiment an octagonal bar, is shown mounted perpendicular to the plane of mounting side 102 of square tubing 100. Octagonal bar 170 includes a mounting end 172 and a protruding end 174. Mounting end 172 is secured to mounting side 102 of tubing 100 by a weld 176, or by some other suitable method of attachment. It should be noted that the frame member to which octagonal bar 170 is secured may be constructed of wood and that bar 170 may be attached thereto by epoxy or some other suitable adhesive or attachment method.

A threaded hole 178 is provided in bar 170. The threaded hole includes a head opening 180 and a bottom opening 182. The threaded aperture 180 extends diagonally through the octagonal bar 170 between two parallel sides thereof.

Protruding end 174 of octagonal bar 170 is smaller in circumference than the opening 115 in elongated tubular member 118. As further discussed hereinafter, there is substantial clearance between the sides of square tube 118 and the outside circumference of bar 170. As in the embodiment of FIGS. 5 and 6, square tube 118 may be mounted to a component of an article of furniture or may itself comprise a component such as a tubular frame member. Square tube 118 and octagonal bar 170 are adapted to axially slip fit together as shown in FIGS. 8 and 9. When octagonal bar 170 is inserted into tube 118 an access opening 120 in square tube 118 aligns with bottom opening 182 of threaded hole 178. As in the embodiment of FIG. 5, access opening 120 may be axially extended to allow access to head opening 180 over a small range of axial positions of square tube 118 and octagonal bar 170 relative to one another. Thus, for instance, opening 120 may be elliptical in shape.

FIG. 9 illustrates the assembled position of octagonal bar 170 with respect to square tubing 118. A set screw 122 is threadedly engaged in threaded aperture 178 and is selectively operable by insertion of a tool through access opening 120 and bottom opening 180 to be adjusted to bear against a first pair of adjacent sidewalls 204 and 206 of square tube 118. As illustrated in FIG. 9, when set screw 122 is adjusted to bear against sidewalls 204 and 206 of tube 118, octagonal bar 170 will be firmly pressed against adjacent sidewalls 203 and 205 of tube 118, thereby creating respective spaces 200 and 202 between respective surfaces 196 and 194 of bar 170. As seen in FIG. 9, square tube 118 has small round fillets 192 in its corner spaces as is conventional for square tubing. By providing an octagonally shaped bar 170, a corner space 190 is created between adjacent sidewalls 203 and 205 of tubing 118 and flat side 210 of bar 170. This permits bar 170 to align and seat perfectly with respect to respective adjacent sidewalls 203 and 205 of square tubing 118 by means of flat sides 210 and 208 of bar 170. By virtue of this arrangement, bar 170 is less likely to work loose because it is securely seated against and aligned with adjacent sidewalls 203 and 205 of tubing 118. As in the embodiment of FIG. 5, the end of set screw 122 firmly bites into the adjacent sidewalls 204 and 206 of tubing 118, as at 198, to firmly engage with and grip tubing 118. By virtue of this arrangement, the metal of tubing 118, which preferably is cold rolled steel or aluminum, will be deformed by set screw 122 which is made of hardened steel to provide a very firm connection between bar 170 and tubing 118. It should also be understood that bar 170 could have various other shapes in order to achieve the creation of a space 190 and the alignment of two sides of bar 170 with adjacent sidewalls 203 and 205 of tubing 118. Thus, for instance, a triangular bar could be used or a bar having sixteen sides.

While this invention has been described as having a preferred design, it will be understood that it is capable of further modification. This application is therefore intended to cover any variations, uses, or adaptions of the invention following the general principles thereof and including such departures from the present disclose as come within known or customary practice in the art to which this invention pertains and fall within the limits of the appended claims.

What is claimed is:

1. A joint for attaching a first component of an article of furniture to a second component thereof, comprising:
    an elongated polygonal tubular member having at least one edge portion, said tubular member mounted at one end to said first component, said tubular member having an end opening, a plurality of generally planar sidewalls and an access opening in said edge portion;
    an elongated polygonal bar member mounted at one end to said second component and being adapted to axially slip fit into said tubular member through said end opening, said bar member including a transverse threaded bore having an end opening, said bar member having at least two generally planar sides located adjacent said bore end opening, said access opening being located to align with said threaded bore when said bar member is slip-fitted into said tubular member;
    and means for locking said bar member within said tubular member when said bar member and said tubular member are operatively assembled with two of said bar member planar sides respectively aligned with and bearing against two of said planar side walls, and said end opening spaced away from said edge portion, said locking means comprising set screw means threadedly engaged with said transverse threaded bore for directly contacting and simultaneously bearing against two of said side walls of said tubular member.

2. The joint according to claim 1 wherein said tubular member is square.

3. The joint according to claim 1 wherein said bar member is octagonal.

4. The joint according to claim 1 wherein said tubular member is square and said bar member is octagonal.

5. The joint according to claim 3 wherein said transverse threaded bore extends from one planar side of said bar member to another planar side of said bar member.

6. In an article of furniture having selected components which are adapted to be disassembled and assembled in a given direction, a joint providing such disassembly and reassembly between said selected components comprising:

two axially mutually separable slip fitting elements, one said element being fixed to one of said selected components and another said element being fixed to another said selected components, said elements being arranged with their axial slip fit in the same direction as said selected components are adapted to be disassembled, said one element comprising a polygonal tubular member having a plurality of generally planar side walls and at least one edge portion, said another element comprising a polygonal bar member having at least two generally planar sides, and means for releasably locking said elements when they are mutually slip fitted, said locking means comprising a set screw means threadably engaged with a transverse threaded bore of said bar member, said transverse threaded bore having an end opening and extending from one planar side of said bar member to another planar side of said bar member, said one element having at least two generally planar sides located adjacent said bore end opening, said set screw means protruding from said bar member and selectively operable transversely of the direction of slip fit to one position for transversely directly contacting and forcefully bearing against two side walls of said tubular member and respectively forcing two of said side walls of said bar member against two of said sides of said tubular member, thereby to lock said tubular and bar members against axial separation, and to another position permitting said tubular and bar members to axially separate, said tubular member having an access opening aligned with and forming a continuation of said transverse threaded bore of said bar member, said end opening spaced away from said access opening, whereby the said two sides of said bar member engage only portions of said two side walls of said tubular member.

7. The joint as set forth in claim 6 wherein said access opening is located in an edge portion of said tubular member.

8. The joint according to claim 6 wherein said tubular member is square and said bar member is octagonal.

9. A joint for attaching a first component of an article of furniture to a second component thereof, comprising:
   an elongated polygonal tubular member having at least one edge portion, said tubular member mounted at one end to said first component, said tubular member having an end opening, a plurality of generally planar sidewalls and an access opening in said edge portion;
   an elongated polygonal bar member mounted at one end to said second component and being adapted to axially slip fit into said tubular member through said end opening, said bar member including a transverse threaded bore having an end opening, said bar member having at least two generally planar sides located adjacent said bore end opening, said transverse threaded bore extending from one planar side of said bar member to another planar side of said bar member
   and means for locking said bar member within said tubular member when said bar member and said tubular member are operatively assembled with two of said bar member planar sides respectively aligned with and bearing against two of said planar side walls, and said end opening spaced away from said edge portion, said locking means comprising a set screw threadedly engaged with said transverse threaded bore, said access opening being located to align with said threaded bore and provide access to said set screw when said bar member is slip fit into said tubular member, said set screw being selectively operable to directly contact and simultaneously bear against two of said side walls of said tubular member.

* * * * *